(12) United States Patent
Ding et al.

(10) Patent No.: US 6,587,293 B1
(45) Date of Patent: Jul. 1, 2003

(54) METHOD FOR SERVO WRITING SERVO PATTERN AT A DESIRED SPEED

(75) Inventors: Ming Zhong Ding, Singapore (SG); Kian Keong Ooi, Singapore (SG); Wei Wei Sun, Singapore (SG); Chiap Heok Ang, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/516,010

(22) Filed: Feb. 29, 2000

Related U.S. Application Data

(60) Provisional application No. 60/132,990, filed on May 7, 1999.

(51) Int. Cl.[7] ................................................. G11B 5/09
(52) U.S. Cl. ............................................. 360/51; 360/75
(58) Field of Search ............................... 360/51, 75, 31, 360/73.03, 77.08, 78.14, 77.02, 78.04

(56) References Cited

U.S. PATENT DOCUMENTS

| | | | |
|---|---|---|---|
| 4,068,268 A | 1/1978 | Idemoto et al. | |
| 4,131,920 A | 12/1978 | Berger | |
| 4,371,902 A | * 2/1983 | Baxter et al. ................. | 360/75 |
| 4,414,589 A | 11/1983 | Oliver et al. | |
| 4,531,167 A | 7/1985 | Berger | |
| 4,797,754 A | 1/1989 | Sugano et al. | |
| 4,831,470 A | 5/1989 | Brunnett et al. | |
| 4,912,576 A | 3/1990 | Janz | |
| 4,977,472 A | 12/1990 | Volz et al. | |
| 4,996,608 A | 2/1991 | Widney | |
| 5,012,363 A | 4/1991 | Mine et al. | |
| 5,119,248 A | 6/1992 | Bizjak et al. | |
| 5,164,863 A | 11/1992 | Janz | |
| 5,202,802 A | 4/1993 | Sidman | |
| 5,339,204 A | 8/1994 | James et al. | |
| 5,448,429 A | 9/1995 | Cribbs et al. | |
| 5,465,182 A | 11/1995 | Ishikawa | |
| 5,485,322 A | 1/1996 | Chainer et al. | |
| 5,570,247 A | 10/1996 | Brown et al. | |
| 5,668,679 A | 9/1997 | Swearingen et al. | |
| 5,742,446 A | * 4/1998 | Tian et al. ..................... | 360/75 |
| 5,790,332 A | 8/1998 | Bucska | |
| 5,796,541 A | 8/1998 | Stein et al. | |
| 6,078,458 A | * 6/2000 | Fioravanti et al. ........ | 360/73.03 |
| 6,084,738 A | * 7/2000 | Duffy ........................... | 360/75 |
| 6,118,604 A | * 9/2000 | Duffy ........................... | 360/48 |
| 6,388,833 B1 | * 5/2002 | Golowka et al. ............. | 360/51 |

* cited by examiner

Primary Examiner—Alan T. Faber
(74) Attorney, Agent, or Firm—Mitchell K. McCarthy

(57) ABSTRACT

A servo writer writes servo information to at least one disc of a head disc assembly. The servo writer includes a clock head that writes a clock track to the at least one disc and generates a clock signal when the clock head reads the clock track on the at least one disc. A servo pattern generator writes servo patterns to the at least one disc in response to the clock signal generated by the clock head reading the clock track on the at least one disc. The servo track writer also includes a phase lock loop clock generator which synchronizes to the clock track and produces the clock signal for the servo pattern generator.

20 Claims, 6 Drawing Sheets

METHOD FOR SERVO WRITING SERVO PATTERN AT A DESIRED SPEED

RELATED APPLICATION

This application claims the benefit under 35 U.S.C. 119(e) of U.S. Provisional Application Serial Number 60/132,990, filed May 7, 1999.

FIELD OF THE INVENTION

The present invention relates to the field of mass storage devices. More particularly, this invention relates to an improved apparatus and method for writing servo information to the disc of a high density disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc drive housing, a disc that is rotated, an actuator assembly that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support the transducer over the disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the transducers) can be positioned over any radial location along the rotating disc surface.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Transducers, in the form of read/write heads attached to the sliders, located on both sides of the storage disc, read and write information on the storage discs when the transducers are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. To write to or read from different tracks, the read/write head is moved radially across the tracks to a selected target track. The data is often divided between several different tracks. While most storage discs utilize a multiplicity of concentric circular tracks, other discs have a continuous spiral forming a single track on one or both sides of the disc.

During manufacture, servo information is encoded on the disc and subsequently used to accurately locate the transducer. The written servo information is used subsequently to locate the actuator assembly/transducer head at the required position on the disc surface and hold it very accurately in position during a read or write operation. The servo information is written or encoded onto the disc with a machine commonly referred to as a servo track writer (hereinafter STW). At the time the servo information is written, the disc drive is typically at the "head disk assembly" (hereinafter HDA) stage. The HDA includes most of the mechanical drive components but does not typically include all the drive electronics. During the track writing process, the STW precisely locates the transducer heads relative to the disc surface and writes the servo information thereon. Accurate location of the transducer heads is necessary to ensure that the track definition remains concentric. If the servo track information is written eccentrically, the position of the transducer head during subsequent operation will require relatively large, constant radial adjustments in order to maintain placement over the track center. When the tracks are sufficiently eccentric, a significant portion of the disk surface must be allotted for track misregistration.

When servo information is encoded or written to the discs of the disc drive several items are very important. First of all, the radial position of the servo marks must be carefully controlled so that the disc drive can always get an indication of the radial position of the transducer with respect to the disc. As a result, motor speed is carefully controlled in current servo writers. If the motor speed is not maintained at a selected RPM (revolutions per minute), repeatable run out error can result in the servo written disc drive. Secondly, the servo writer should not write in non-repeatable run out. This can happen if portions of HDA are vibrating during the servo writing operation. For example, the actuator may resonate at one rotational frequency. At other rotational frequencies, there can be spindle motor gyro effect or disc fluttering.

A constant desire or industry goal is to increase the storage capacity of disc drives. One way to increase capacity is to increase the density of tracks on the disc. Currently, the number of tracks per inch (TPI) is growing at a rate of 60% per year. It is contemplated that this trend will continue and further more that the percentage growth may even increase.

During manufacture, the time required to servo write a disc drive is lengthy. With the increased number of tracks on a disc and the constant trend to increase the number of tracks per inch, the length of time for servo writing discs will also increase. Another pressure is to cut down production time for disc drives. One way of doing this is by servo writing the disc while spinning the disc at a higher RPM than the designed spindle speed of the disc drive.

Presently, the selection of a rotational speed for the disc drive is severely constrained or limited by several factors. Present designs of servo writers do not allow for easy, flexible selection of the servo writer spindle motor speed. Spindle motor speed selection for a servo writer is generally constrained by many factors including the spindle motor gyro effect, disc flutter, the servo clock and the servo pattern. There are other factors that also may influence speed selection. Normally, the spindle motor is optimized at the disc drives operating speed so that the above factors are minimized at the operating spindle speed. At many of the spindle motor speeds other than the operating spindle motor speed, a bearing defect may very well induce the spindle motor gyro effect. The spindle motor gyro effect will generally cause a non-repeatable run out. This non-repeatable run out will be "frozen" during servo writing process, subsequently seen by the drive as written in repeatable run out. At other speeds, other factors may result in either non-repeatable run out (NRRO) or repeatable run out (RRO) in a written servo pattern.

Typically, there are other "good" spindle speeds where the factors that cause either non-repeatable run out (NRRO) or repeatable run out (RRO) during servo writing process will be minimized. However, many times the "good" spindle speeds do not match the frequency at which the servo writer must write to produce the desired servo pattern.

To servo write at the "good" speed, the servo writer clock may have to run at some odd frequency that is impossible for most of the servo writer. Usually the servo writer clock is driven by a crystal and PLL (Phase lock loop) which typically has limited selections.

To servo write at higher spindle speed, normally the servo clock frequency is increased to the next higher clock from the normal operating clock. This will increase the spindle motor speed proportionally without altering the original servo pattern format. For example, the operating speed for the drive is 5400 rpm and the servo clock is 50 MHZ. If the next higher servo clock available is 60 MHZ, then the spindle motor speed will be (60*5400/50) rpm or 6480 rpm. If the new speed does conflict with the gyro frequency, then check at the next servo clock frequency and the step is repeated until a good speed is found or reaches the maximum servo clock frequency. However, if the calculation shows a match between the servo frequency and a good higher motor speed, the spindle motor may not be able to run at the speed due to the strong spindle motors' bemf and motor driver saturation.

Accordingly, what is needed is an apparatus and method for use with a servo track writer (STW) that will allow the servo patterns to be written at any speed of the spindle motor so that a spindle speed may be selected that minimizes the factors resulting in either non-repeatable run out (NRRO) or repeatable run out (RRO). What is also needed is a servo writing technique that allows the servo to be written at higher spindle speeds than the operating spindle speed so that the total manufacturing time can be reduced by increasing the throughput of the servo write operation. What is also needed is a method and apparatus which uses the current servo writing equipment.

SUMMARY OF THE INVENTION

The present invention is directed to reducing these problems, especially the non-repeatable track writing errors due to imperfect bearings. The invention is a method for writing servo patterns on at least one disc in a disc drive. The method includes the steps of spinning the disc at a first selected rotational speed and writing a clock track on the disc at the first selected rotational speed. The method further includes spinning the disc at a second rotational speed while tracking the written clock track pattern on the disc using the servo clock phase lock loop circuitry as the disc rotates at the second rotational speed. Servo information is written while the disc is rotated at the second rotational speed. The second rotational speed may be selected so that it is faster than the first rotational speed. The second rotational speed is selected to minimize the causes of repeatable and non-repeatable run out in the disc drive. The method may further include the step of selecting the second rotational speed which is faster than the first rotational speed, said second rotational speed selected so as to minimize the causes of repeatable and non-repeatable run out in the disc drive. The second rotational speed is selected so as to minimize a spindle motor gyro effect in the disc drive. The method also includes writing the servo information using the clock signal generated by phase lock loop circuitry tracking the clock track on the disc. The servo patterns are generated in response to the clock signal generated by phase lock loop circuitry tracking the clock track on the disc. The method can also include generating servo patterns in response to the clock signal generated by phase lock loop circuitry tracking the clock track on the disc, and writing the generated servo patterns to the disc at an area other than the area of the disc having the clock track. The method also includes writing the generated servo patterns to each surface of the disc at an area other than the area of the disc having the clock track. The disc will have two surfaces.

Also disclosed is a servo track writer for writing servo information to a head disc assembly which includes at least one disc and a transducing head. The servo track writer includes a clock head placed in transducing relation to the disc. The clock head writes a clock track to the at least one disc and generates a clock signal when the clock head reads the clock track on the at least one disc. The invention also includes a servo pattern generator that writes servo patterns to the at least one disc in response to the clock signal generated by the clock head reading the clock track on the at least one disc. The servo track writer further includes a phase lock loop clock generator which synchronizes to the clock track and produces the clock signal for the servo pattern generator. The servo pattern generator writes with the transducing head. The at least one disc has a first surface and a second surface. The servo pattern generator writes to the first surface and the second surface of the disc. The servo pattern generator may write an embedded servo information pattern to the at least one disc with the transducing head.

The servo track writer further includes a mounting fixture for mounting the head disc assembly. The mounting fixture provides a mechanical reference for the servo track writer as servo information is written to the head disc assembly. A positioner for controlling the position of an actuator of the head disc assembly is also included. The servo track writer also includes a spindle controller for controlling a spindle motor of the head disc assembly. The spindle controller is capable of controlling the spindle at a first operating speed and a second servo writing speed. The second servo writing speed may be selected to be faster than the first operating speed of the spindle. The servo track writer further includes a controller for controlling the positioner, the servo pattern generator, the phase lock loop clock generator, and the spindle controller.

Most generally, the invention is to a servo track writer for writing servo information to a head disc assembly includes a servo pattern generator, and a device for writing servo information to the disc while the disc rotates at a speed other than the operating speed of the disc drive.

Advantageously, the method and apparatus of the present invention allows servo patterns to be written to a disc at any speed of the spindle motor using a servo track writer (STW). In other words, a spindle speed that minimizes the factors resulting in either non-repeatable run out (NRRO) or repeatable run out (RRO) from the servo track writer (STW) is selected. The servo writing technique allows the servo to be written at higher spindle speed than the operating spindle speed so that the total manufacturing time can be reduced by increasing the throughput of the spindle write operation. A further advantage is that the method and apparatus uses the current servo writing equipment. The equipment is used in a different way so that there is little, if any, additional equipment cost resulting from using the invention.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
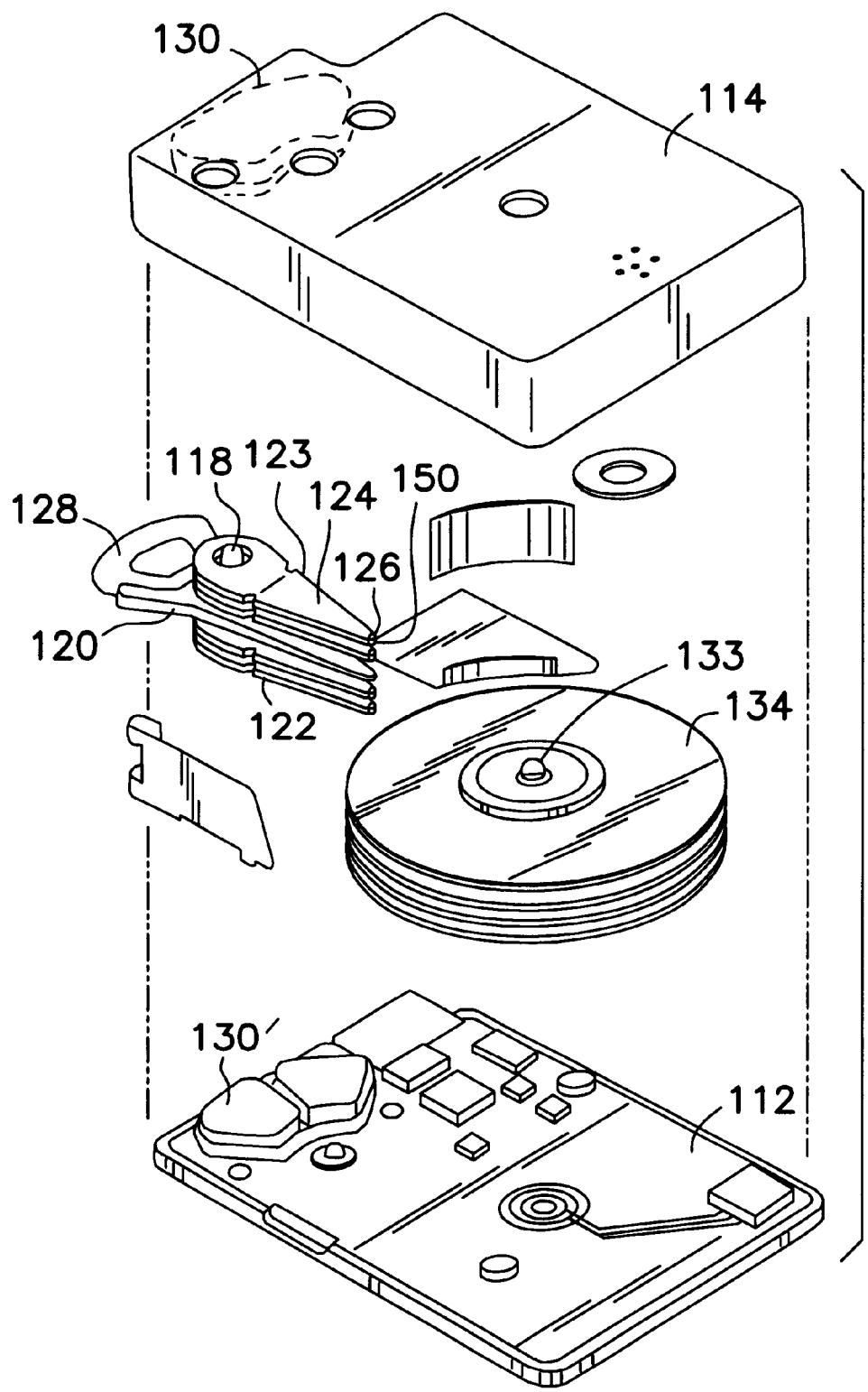
FIG. 1 is an exploded view of a disc drive with a multiple disc stack.

The invention described in this application is useful with most all mechanical configurations of disc drives utilizing either rotary or linear actuation. FIG. 1 is an exploded view of one type of a disc drive 100 having a rotary actuator. The disc drive 100 includes a housing or base 112, and a cover 114. The housing 112 and cover 114 form a disc enclosure. Rotatably attached to the housing 112 on an actuator pivot shaft 118 is an actuator assembly 120. The actuator assembly 120 includes a comb-like structure 122 having a plurality of arms 123. Attached to the separate arms 123 on the comb 122 are load beams or load springs 124. Load beams or load springs are also referred to as suspensions. Attached at the end of each load spring 124 is a slider 126 which carries a magnetic transducer head 150. The slider 126 with the transducer 150 form what is frequently called the head. It should be noted that many sliders have one transducer 150 and that is what is shown in the figures. However, this invention is equally applicable to sliders having more than one transducer, such as what is referred to as an MR or magneto resistive head in which one transducer 150 is generally used for reading and another is generally used for writing.

On the end of the actuator assembly 120 opposite the load springs 124 and the sliders 126 is a voice coil 128. Located above and below the voice coil 128 is a first magnet 130 and a second magnet 131. As shown in FIG. 1, the first magnet 130 is associated with the cover 114 while the second magnet is adjacent the housing 112. The first and second magnets 130, 131, and the voice coil 128 are the key components of a voice coil motor which applies a force to the actuator assembly 120 to rotate it about the actuator pivot shaft 118. Also mounted to the housing 112 is a spindle motor (not shown). The spindle motor includes a rotating portion called the spindle hub 133. In this particular disc drive, the spindle motor is within the hub. In FIG. 1, a number of discs 134 are attached to the spindle hub 133. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or, alternatively, under the hub.

The disk drive 100 includes the mechanical components discussed above as well as various electronic components such as a printed circuit board (not shown) typically attached to the lower (as viewed in FIG. 1) side of the housing 112. Without the circuit board and other electronics, the disc drive is often referred to as a head disc assembly or HDA 152. Stated alternatively, the mechanical components, including the drive housing 112, cover 114, actuator assembly 120, pivot shaft 118, arms 123, transducer heads 150, spindle hub 133, spindle shaft 138, and discs 13, among others, generally define the HDA 152. The HDA is a convenient sub-assembly for completing various manufacturing processes including servo track writing. For instance, the HDA provides physical access to the voice coil 128 during manufacture via apertures 136 but can thereafter be sealed (hermetically if necessary) to ensure that the internal components remain substantially contaminant-free. Near the end of production, the drive electronics are assembled to the HDA 152 to produce the disc drive 100.

Figure 2:
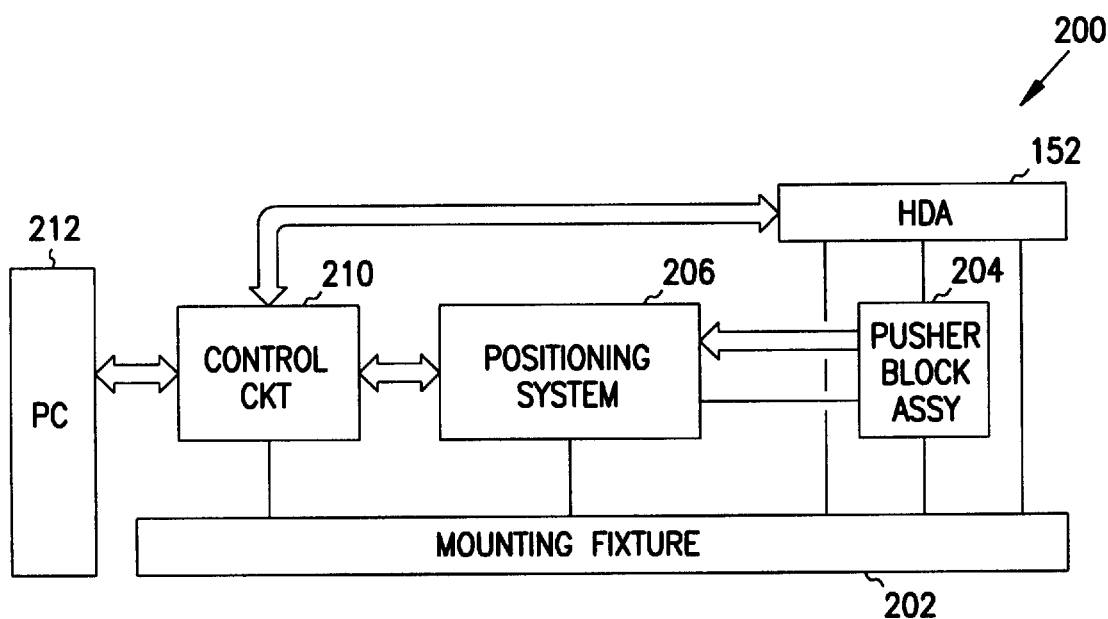
FIG. 2 is a schematic representation of a servo track writer used to write the servo information to the discs of the head disc assembly of FIG. 1.

Referring now to FIG. 2, shown therein is a schematic representation of a servo track writer 200, constructed in accordance with the preferred embodiment of the present invention. As discussed below, the servo track writer 200 serves to write the servo information to the discs 134 (shown in FIG. 1) during manufacturing of the HDA 152.

As shown in FIG. 2, the HDA 152 is mounted over a mounting fixture 202 which serves as a mechanical reference for the servo track writer 200. The mounting fixture 202 typically comprises a granite block (not separately designated in FIG. 2) having a calibrated, level top surface on which a mounting plate (also not separately designated in FIG. 2) is placed. The mounting plate includes clamps (not shown) which locate and secure the HDA 152 to the mounting fixture 202. As such mounting fixtures 202 are well known, additional discussion will not be provided herein except to state that the HDA 152 is mounted in such a manner so as to provide access to the E-block of the actuator assembly 120 (shown in FIG. 1) by the servo track writer 200 during a servo write operation.

Continuing with FIG. 2, a pusher block assembly 204 is also mounted to the mounting fixture 202 underneath the HDA 152 so as to engage the actuator assembly 120 of the HDA 152 in order to selectively position the actuator assembly 120 relative to the discs 134. Typically an opening (not shown) is provided in the bottom of the deck or base 112 (shown in FIG. 1) of the HDA 152 so that the pusher block assembly 204 can access the internal environment of the HDA 152 by extending up through the opening in the deck or base 112. Once the servo information is written, the opening is typically covered by an adhesive label or other means to seal the internal environment of the HDA. Further, it will be recognized that, as actuator assemblies (such as shown at 120 in FIG. 1) typically include a mechanical bias either towards the inner or the outer diameter of the discs 134, the pusher pin engages the actuator against this bias and exerts a horizontal force upon the actuator. Thus, it is unnecessary to mechanically secure the pusher block assembly 204 to the actuator assembly 120; instead, the existing bias of the actuator assembly is typically used to ensure contact is maintained between the pusher block assembly 204 and the actuator assembly 120.

Moreover, the servo track writer 200 further comprises a positioning system 206 which rotates the pusher block assembly 204 about a central axis (not shown in FIG. 2, for purposes of clarity) in order to advance the position of the actuator assembly 120. The position of the pusher block assembly 204 is controlled by the positioning system 206 through detection means (not separately shown) which detects the position of the pusher block assembly 204 and provides correction signals to a motor (also not separately shown) of the positioning system 206 in order to rotate the pusher block assembly 204 accordingly. In the preferred embodiment, the positioning system 206 comprises a laser based, closed loop positioner utilizing a laser and appropriate sensors to detect the position of the pusher block assembly 204, although it will be recognized that other types of positioning systems can be used. One such laser based positioning system is model 137K15, manufactured by Teletrak Inc. As will be recognized, the positioning system 206 is mounted to the mounting fixture 202 relative to the HDA 152.

Continuing with FIG. 2, the servo track writer 200 is further shown to include a control circuit 210 which interfaces with a PC 212 and controls the operation of the servo track writer 200 and the HDA 152 during a servo write operation, including the transfer of the servo information to the HDA 152 from the PC 212.

During operation of the servo track writer 200 to write the servo information to the HDA 152, a user mounts the HDA 152 to the mounting fixture 202 and instructs the servo track writer 200 (by way of the PC 212) to commence writing the servo information to the HDA 152. As a result, the controller circuit 210 instructs the HDA 152 to commence rotation of the discs 134 by way of the spindle motor 16 (shown in FIG. 1) and instructs the pusher block assembly 204 to place the actuator assembly 20 at a starting position (typically near the outer diameter of the discs 134). The servo track writer 200 will thereafter instruct the HDA 152 to write the servo information to each of the surfaces of the discs 134, while mechanically advancing the pusher block assembly 204 so as to define each new successive track on the discs 134. For dedicated servo systems, the entire surface of one of the discs 134 will receive the servo information, written by the corresponding servo head 150 (shown in FIG. 1). For embedded servo systems, each of the heads 150 in turn will write the servo information to the corresponding discs at the appropriate locations.

The time required to write the servo information to a typical HDA depends upon the amount of servo tracks to be written to the discs, the rotational speed of the discs 134 and the number of discs 134, but for purposes of reference, it may take the servo track writer 200 as much as 30 minutes to complete the servo write operation. Typically, the servo write operation requires a relatively significant amount of time in a large scale disc drive manufacturing operation wherein thousands of disc drives are manufactured each day. Hence, the importance of correctly writing the servo information to the HDA 152 will be recognized, as the time required to rewrite servo information to a population of drives can be extensive. Although servo track writers 200 typically perform some level of testing of the servo information, frequencies in the PES may not be detected until subsequent manufacturing operations when the PCB is mated with the HDA 152 and system level testing of the disc drive is performed.

Figure 3:
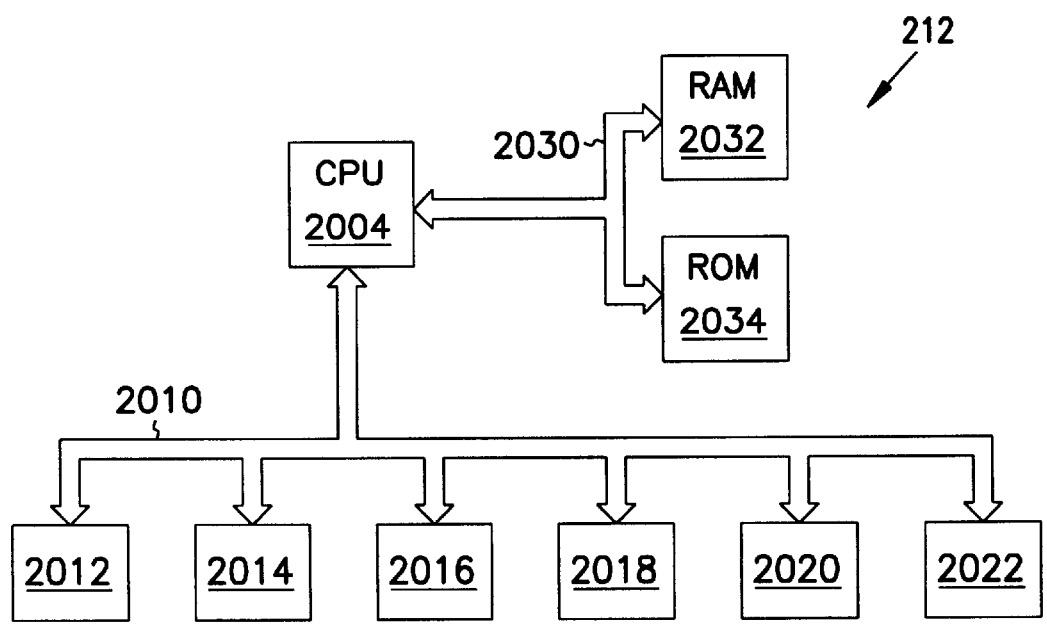
FIG. 3 is a schematic view of the personal computer used as part of the servo track writer.

FIG. 3 is a schematic view of a computer system, such as the personal computer 212 shown in FIG. 2. The computer system 2000 may also be called an electronic system or an information handling system or a controller and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 is attached to the HDA 152 attached to the servo writer 200. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. The personal computer 212 is used as a controller for the servo writer 200. The personal computer 212 may receive data and output control signals for moving the actuator 120 of the HDA 152. The personal computer 212 is used to perform operations on the data input thereto.

Figure 4:
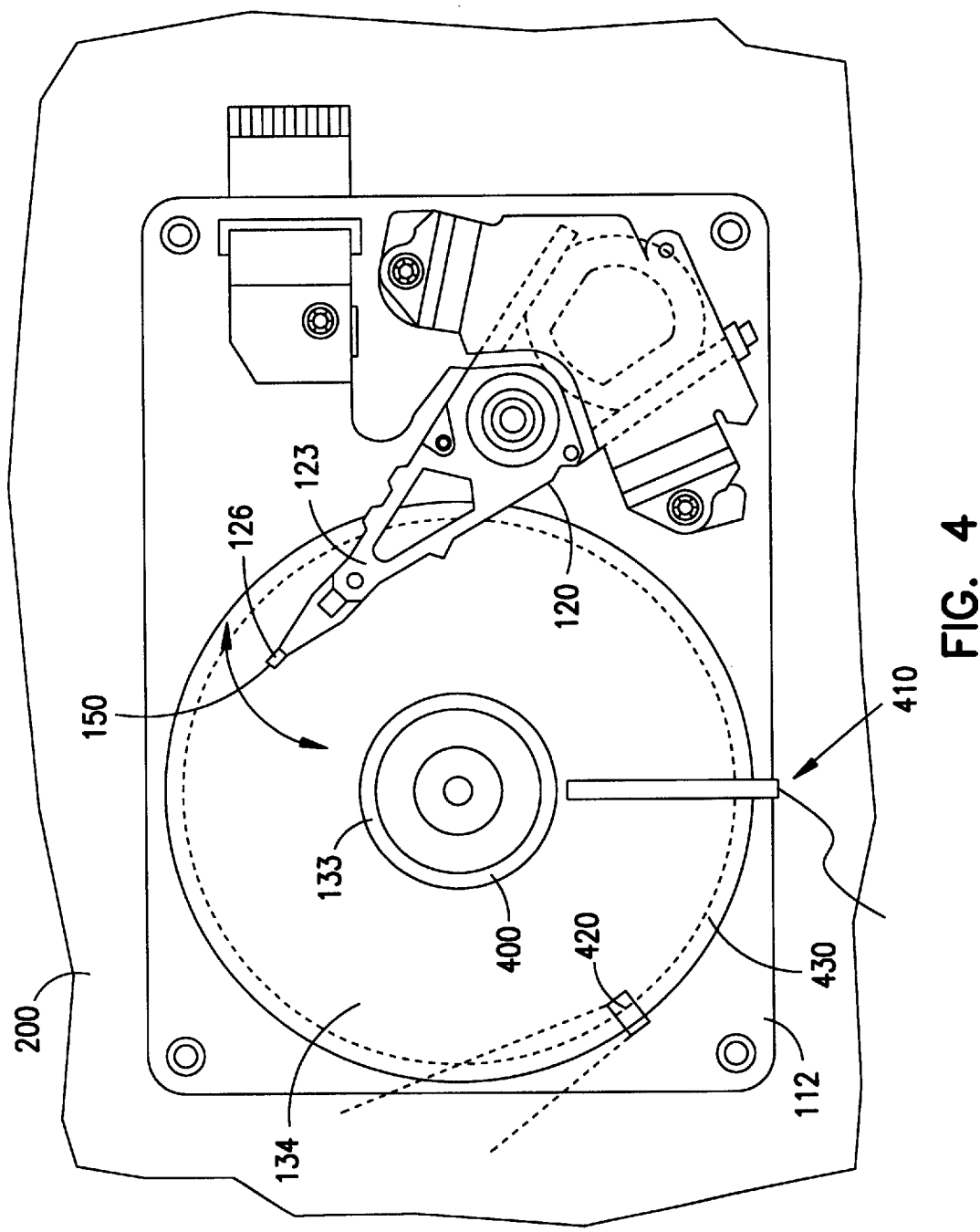
FIG. 4 is a top view of a head disc assembly positioned within a servo track writer.

FIG. 4 is a top view of a head disc assembly 152 positioned within a servo track writer 200. The head disc assembly 152 shown in FIG. 4 is for a disc drive 100 which is different than the disc drive from FIG. 1. It should be noted that a servo writer 200 can be used to write servo track to the disc drives. The head disc assembly 152 shown in FIG. 4 includes at least one disc 134 and an actuator 120. The actuator 120 includes arms 123 which carry sliders 126. A transducer head 150 is positioned within the slider 126. The disc 134 is placed on the hub 133. The hub is placed on a spindle which is essentially a shaft about which the hub 133 rotates. A spindle bearing (not shown) is positioned between the spindle or shaft and the hub 133. The disc or discs are clamped to the hub with a disc clamp 400. The disc clamp 400 is annular and fits over the top of the hub 133. A clock head 420 is positioned over the disc 134 when it is placed in the servo writer 200. The clock head 420 is used to write a clock track 430 to the disc 134. Reading the clock track 430 with the clock head 420 generates a clock signal. The clock signal is used to control the spindle speed. The clock signal generated is also used to time generation of servo patterns written to the disc 134 with the transducing head 150.

Figure 5:
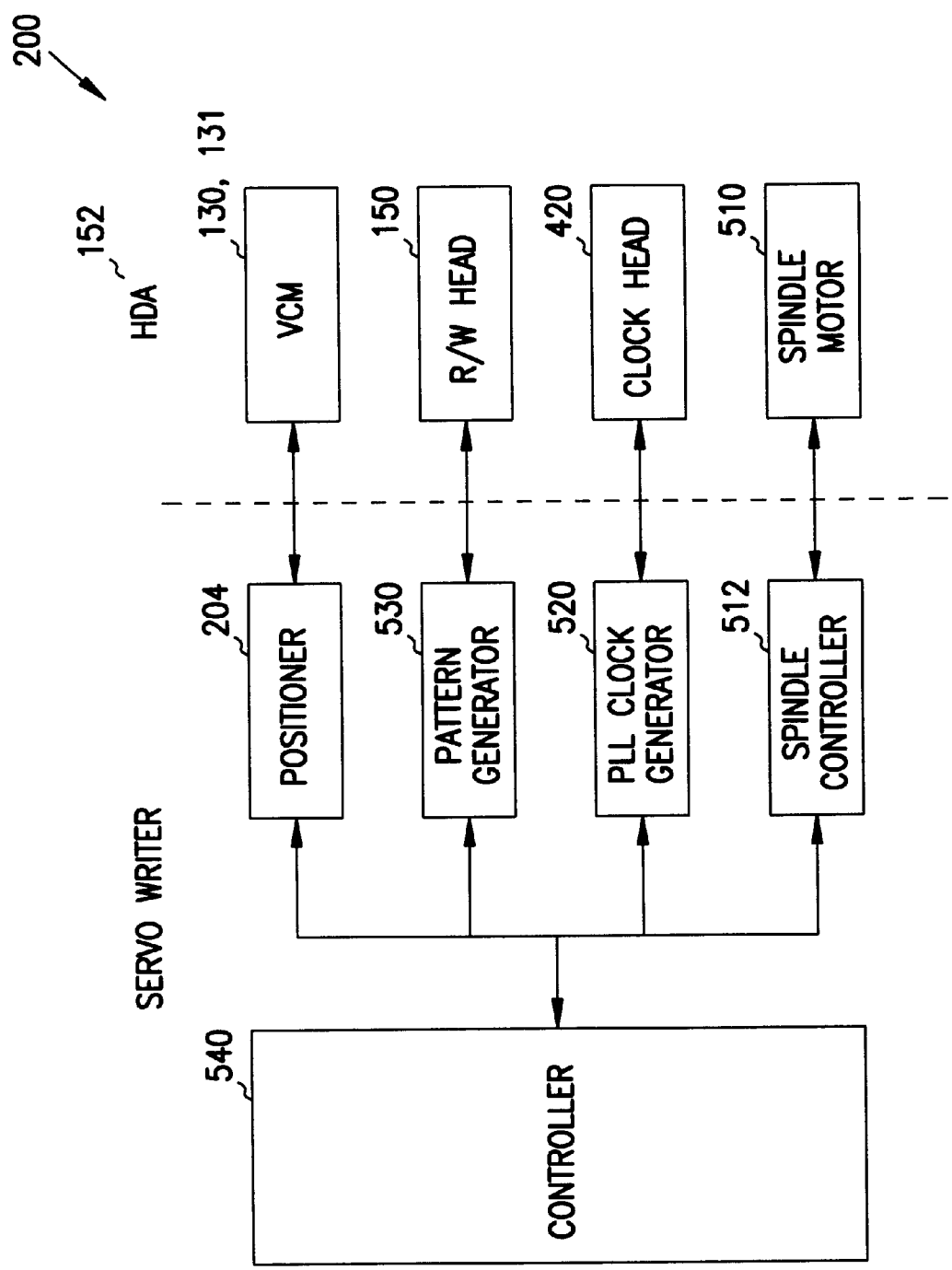
FIG. 5 is a block diagram of the servo track writer.

Turning now to FIG. 5, a block diagram of the servo track writer 200 is shown. The servo track writer 200 includes a positioner 204 which is used to control the voice coil motor 130, 131. The voice coil motor 130, 131 moves the actuator 120 which in turn moves the read/write head 150 so that it is microstepped to a new position for writing servo patterns. The positioner 204 controls the microstepping of the read/write heads 150 with the help of a laser-optical sensor (not shown). The head disc assembly or HDA 152 includes a spindle motor 510. The servo track writer 200 includes a spindle controller 512 which controls the rotational speed of the disc 134 (shown in FIGS. 1 and 4). The spindle controller 512 spins the spindle motor 510 at a first speed which equals the operating speed of the disc drive 100 when the clock head 420 is used to write the clock track 430. The spindle controller 512 rotates the disc 134 at a second selected speed substantially distinct from the first selected speed for writing the servo pattern to the disc or to both surfaces of one of the discs 134. Typically, the second selected speed is faster than the operating speed so that the throughput at the servo track writer 200 is increased during the manufacturing process the clock head 420 read s the clock track 430 on the disc drive 134 and produces an input to a phase lock loop clock generator 520 of the servo track writer 200. The phase lock loop clock is locked onto the clock track 430 on the disc and will compensate for any spindle motor 510 jitter or speed error while servo writing is taking place. The phase lock loop clock generator output is a clock signal which is fed to a pattern generator 530. The pattern generator writes the servo pattern to the disc 134 or to the first and second surfaces of the disc 134. The pattern generator 530 places wedges of servo information onto the surfaces of the disc 134. The positioner tool for the pattern generator 530, the phase lock loop clock generator 520 and the spindle controller 512 are all controlled by a controller 540 within the servo track writer 200.

Figure 6A:
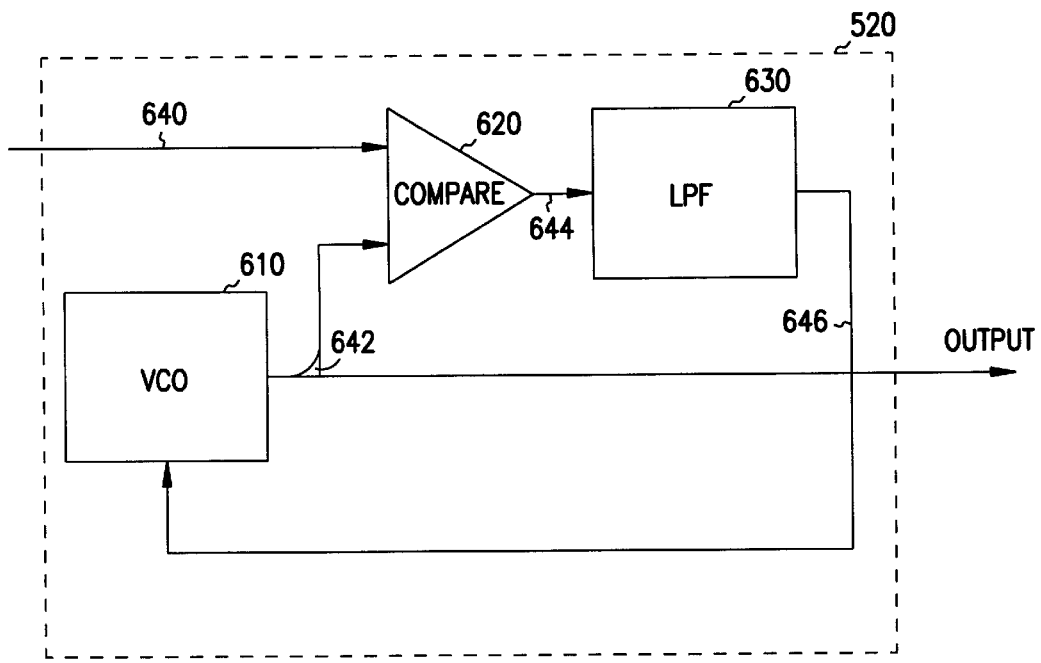
FIG. 6A is a block diagram of the phase lock loop circuitry.
Figure 6B:
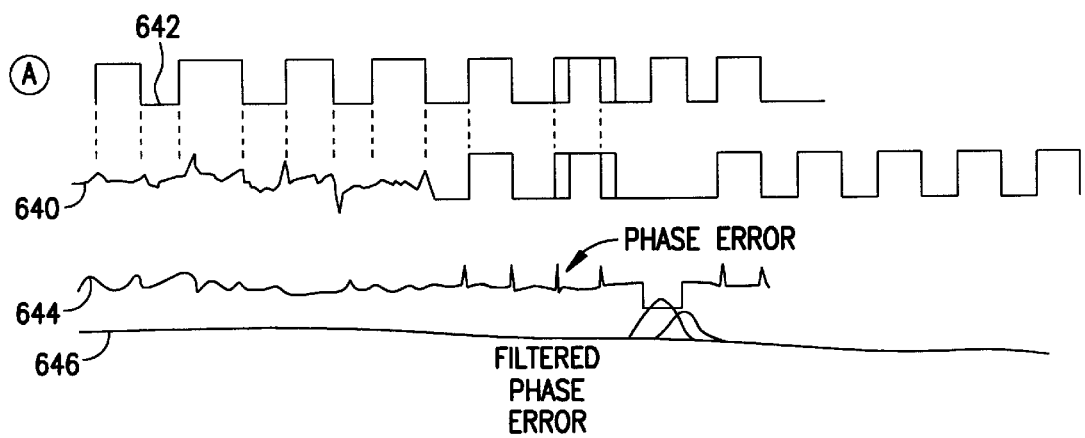
FIG. 6B is a diagram showing several of the signals associated with the phase lock loop circuitry of FIG. 6A.

FIG. 6A is a block diagram of the phase lock loop circuitry while FIG. 6B shows several signals associated with the phase lock loop circuitry. The phase lock loop clock generator 520 includes a voltage-controlled oscillator 610, a comparator 620 and a low pass filter 630. The signal read by the clock head 420 is input to the comparator as signal 640. Also input to the comparator is the out put of the voltage-controlled oscillator 610, which is set forth as signal 642. Signal 642 is also the output of the phase lock loop clock generator 520 which is input to the pattern generator 530 (shown in FIG. 5). Comparator 620 compares input signal 640 and the VCO output 642 and produces a different signal 644 which shows the phase error between the voltage-controlled output and the input from the clock head 420. The output of the comparator 620 is signal 644 and shows the phase error between the voltage-controlled oscillator 610 and the input signal 640. The output of the comparator or signal 644 is input to the low pass filter 630. After being filtered, a signal 646 showing the filtered phase error is produced. The filtered phase error signal 646 is fed back to the voltage-controlled oscillator 610 so that it can sync up to the input signal 640. It should be noted that the input signal 640 and the output of the voltage-controlled oscillator 642 can be divided by any integer to produce an output at any particular frequency.

Figure 7:
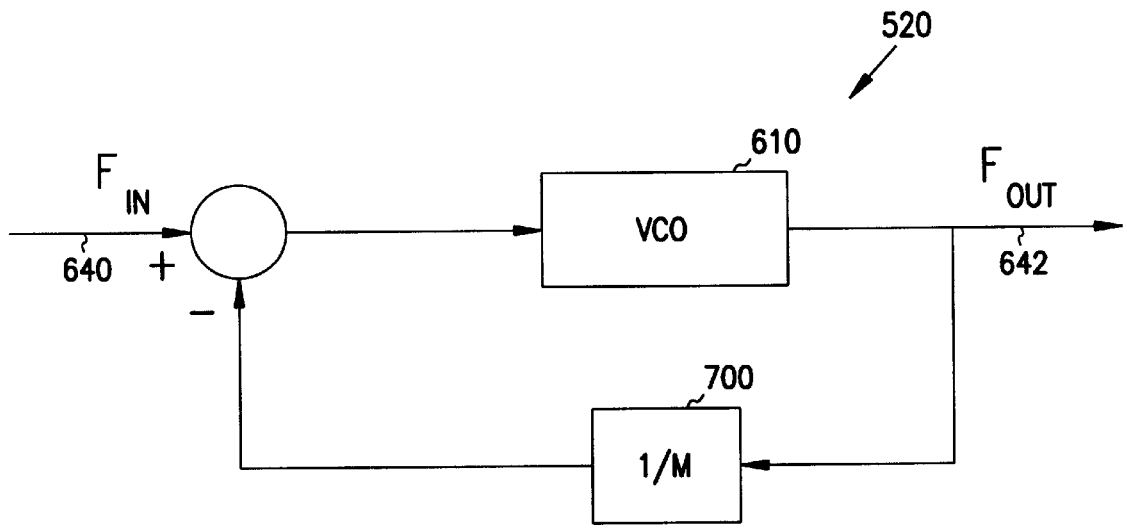
FIG. 7 is a block diagram of the phase lock loop showing the frequency relationship between the input and the output.

FIG. 7 is a block diagram of the phase lock loop showing the frequency relationship between the input of the phase lock loop clock generator 520 and the output of the phase lock loop 642. In FIG. 7 the phase lock loop circuit 520 is shown as a voltage-controlled oscillator 610 with a feedback loop of 1/M where M is a constant and is depicted by reference numeral 700. Letting the number of servo clock cycles per revolution equal N, and the servo clock frequency equal $f_s$, it can be seen that the motor speed and revolutions per minute (rpm) equals $$f_s \times \frac{60}{N}. \tag{1}$$

From equation (1) the spindle motor speed is proportional to the servo clock's frequency if N is kept constant. For a given clock track, the number of transitions along the track will remain constant since it is carefully written one time and does not vary during the servo writing process. Now looking at the phase lock loop diagram shown in FIG. 7, the transfer function of the phase lock loop clock generator 520 is as follows:

$$f_{out}=f_{in}\times M \tag{2}$$

where M is a constant. The $f_{in}$ is the clock signal 640 from the disc that will be tracked by the phase lock loop clock generator 520 and the circuitry shown in FIG. 6 and it gives the output as $f_{out}$. The frequency of the output or $f_{out}$ will then be fed to the pattern generator 530 to clock out the servo pattern at the correct timing on the disc 134. Letting $f_s$ equal to $f_{out}$ from equations (1) and (2), it follows that $$\text{rpm} = f_{in} \times M \times \frac{60}{N} \tag{3}$$

Again, from equation (3), the clock signal 640 from the disc is directly proportional to the spindle motor speed. Hence, if the spindle speed is varied from one speed to another, the clock frequency will also vary if it is still within the phase lock loop clock generator 520 capture range. Equations (1), (2) and (3) prove that we can write the clock pattern at one spindle speed and write the servo pattern at another spindle speed as long as the phase lock loop clock generator 520 is tracking the clock pattern or the clock track 430 on the disc 134. When the clock pattern is written at a first rpm, equation (3) becomes $$\text{rpm}1 = f_{in}1 \times M \times \frac{60}{N} \tag{4}$$

when the spindle motor speed is changed to rpm2, which is the second speed where servo is written, equation (:

$$Rpm2=f_{in}2\times M\times 60N$$

from equations (4) and (5), $$\text{rpm}1 \div f_{in}1 = \text{rpm}2 \div f_{in}2 \text{ which also equals } M \times \frac{60}{N} \tag{5}$$

$$M \times \frac{60}{N}$$

is a constant and both $$\frac{\text{rpm}1}{f_{in}1}$$

are equal to the constant.

By increasing the capture range for the phase lock loop clock generator circuitry 520 for the servo writer 200, the phase lock loop clock generator 520 can be used to track the spindle speed jitter and small variation during servo writing as well as providing clocking at two selected speeds or for that matter, any selected speed within the range of the phase lock loop circuitry capture range.

Figure 8:
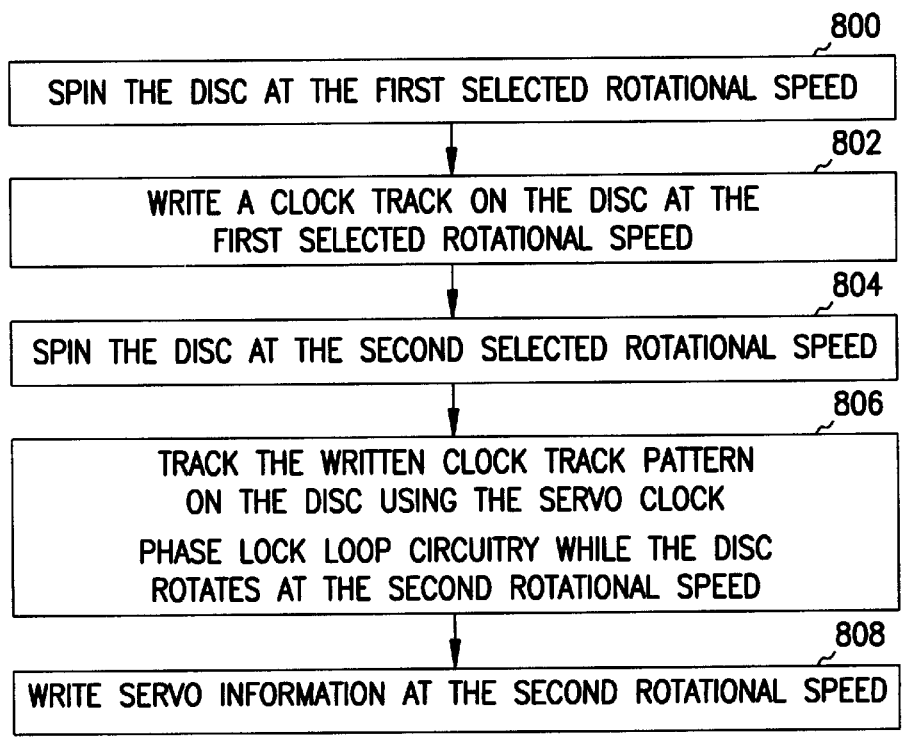
FIG. 8 is a flow diagram showing the invention in operation.

FIG. 8 is a flow diagram showing the invention in operation. In operation, the disc 134 is spun at a first selected rotational speed, as depicted by step 800 in FIG. 8. The first selected speed is typically the operating speed of the disc drive 100 as it is designed to operate in the assembled disc drive. While spinning at the first selected speed, a clock track is written on the disc 134 at the first selected rotational speed, as depicted by step 802. The next step is to spin the disc at a second rotational speed, as depicted by step 804. While spinning at the second rotational speed, the written clock track pattern 430 on the disc 134 is tracked using the phase lock loop circuitry 520. The phase lock loop circuitry 520 is used to produce a clock signal 642 which is input to the pattern generator 530. The pattern generator outputs the servo signal information and controls the read/write heads 150 to write the servo information at the second rotational speed to the disc 134, as depicted by step 808 in FIG. 8. Thus, the invention provides for a servo track writer 200 that tracks the clocking track 430 with the clock head 420 and uses the phase lock loop clock generator 520 to output a signal that in turn is directly input into the pattern generator 530 so that the read/write head 150 can be used to write the servo signals to the surface of the disc 134 at any of a selected number of speeds. Typically the second rotational speed is selected so that the effects that would cause non-repeatable runout or repeatable runout at the servo track writer would be minimized. For example, the second rotational speed will be selected so that effects such as the spindle motor gyro effect will be minimized. Thus, the invention allows selection of a second rotational speed for servo track writing that is outside of a range where nonrepeatable runout or runout errors from the servo track write will occur.

Advantageously, the method and apparatus of the present invention allows servo patterns to be written to a disc 134 at any speed of the spindle motor 510 using a servo track writer (STW). In other words, a spindle speed that minimizes the factors resulting in either non-repeatable run out (NRRO) or repeatable run out (RRO) from the servo track writer (STW) is selected. The servo writing technique allows the servo to be written at higher spindle speed than the operating spindle speed so that the total manufacturing time can be reduced by increasing the throughput of the spindle write operation. On the other hand, the invention also allows the first speed to be slower than the normal operating speed, thus allowing the clock pattern to be written with a lower frequency. The resulting clock track will be more precise, clock pulse with less coherent problem and the mechanical structure vibration is less at a lower speed. To reduce the written in RRO especially for high RPM (>7200 rpm) drive where the disc vibration is a problem, it is desired to choose a slower second speed, as compared to the normal drive operating speed, during track writing despite the increased process time. This is typically true for high performance drives where the cost is not so critical. A further advantage is that the method and apparatus uses the current servo writing equipment. The equipment is used in a different way so that there is little, if any, additional equipment cost resulting from use of the invention.

CONCLUSION

In conclusion, the invention is a method for writing servo patterns on at least one disc 134 in a disc drive 100. The method includes the steps of spinning the disc at a first selected rotational speed 800 and writing a clock track on the disc at the first selected rotational speed 802. The method further includes spinning the disc at a second rotational speed 804 while tracking the written clock track pattern on the disc using the servo clock phase lock loop circuitry as the disc rotates at the second rotational speed 806. Servo information is written while the disc is rotated at the second rotational speed 808. The second rotational speed may be selected so that it is faster than the first rotational speed. The second rotational speed is selected to minimize the causes of repeatable and non-repeatable run out in the disc drive 100. The method may further include the step of selecting the second rotational speed which is faster than the first rotational speed, said second rotational speed selected so as to minimize the causes of repeatable and non-repeatable run out in the disc drive 100. The second rotational speed is selected so as to minimize a spindle motor 510 gyro effect in the disc drive 100. The method also includes writing the servo information using the clock signal generated by phase lock loop circuitry 520 tracking the clock track 430 on the disc 134. The servo patterns are generated in response to the clock signal 640 generated by phase lock loop circuitry 520 tracking the clock track 430 on the disc 134. The method can also include generating servo patterns in response to the clock signal 640 generated by phase lock loop circuitry 520 tracking the clock track 430 on the disc 134, and writing the generated servo patterns 808 to the disc 134 at an area other than the area of the disc having the clock track 430. The method for also includes writing the generated servo patterns to each surface of the disc 134 at an area other than the area of the disc 134 having the clock track 430. The disc 134 will have two surfaces.

Also disclosed is a servo track writer 200 for writing servo information to a head disc assembly 152 which includes at least one disc 134 and a transducing head 150. The servo track writer 200 includes a clock head 420 placed in transducing relation to the disc 134. The clock head 420 writes a clock track 430 to the at least one disc 134 and generates a clock signal when the clock head reads the clock track 430 on the at least one disc 134. The invention also includes a servo pattern generator 530 that writes servo patterns to the at least one disc 134 in response to the clock signal 640 generated by the clock head 420 reading the clock track 430 on the at least one disc 134. The servo track writer 200 further includes a phase lock loop clock generator 520 which synchronizes to the clock track 430 and produces the clock signal 640 for the servo pattern generator 530. The servo pattern generator 530 writes with the transducing head 150. The at least one disc 134 has a first surface and a second surface. The servo pattern generator 530 writes to the first surface and the second surface of the disc 134. The servo pattern generator 530 may write an embedded servo information pattern to the at least one disc 134 with the transducing head 150.

The servo track writer 200 further includes a mounting fixture 202 for mounting the head disc assembly 152. The mounting fixture 202 provides a mechanical reference for the servo track writer 200 as servo information is written to the head disc assembly 152. A positioner 204 for controlling the position of an actuator 120 of the head disc assembly 152 is also included. The servo track writer 200 also includes a spindle controller 512 for controlling a spindle motor 510 of the head disc assembly 152. The spindle controller 512 is capable of controlling the spindle 510 at a first operating speed and a second servo writing speed. The second servo writing speed may be selected to be faster than the first operating speed of the spindle. The servo track writer 200 further includes a controller 540 for controlling the positioner 202, the servo pattern generator 540, the phase lock loop clock generator 520, and the spindle controller 510.

Most generally, a servo track writer 200 for writing servo information to a head disc assembly 152 includes a servo pattern generator 540, and a device for writing servo information to the disc while the disc rotates at a speed other than the operating speed of the disc drive 100.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed and desired to be secured by Letters Patent of the United States is:

1. A method by steps comprising:
    (a) spinning a disc at a first selected rotational speed;
    (b) writing a clock track on the disc at the first selected rotational speed;
    (c) spinning the disc at a second rotational speed substantially distinct from the first selected rotational speed;
    (d) producing a clock signal from the written clock track pattern written on the disc while the disc rotates at the second rotational speed;
    (e) generating a servo pattern with a pattern generator clocked to the clock signal, wherein the pattern generator clocks out the servo pattern for writing the servo pattern to the disc at a correct timing substantially synchronized to the clock signal; and
    (f) writing the servo pattern to the disc at the correct timing relative to the clock signal while the disc rotates at the second rotational speed substantially distinct from the first selected rotational speed.

2. The method for writing servo patterns as recited in claim 1 wherein the first and second rotational speeds are higher than a normal operating speed of the disc drive.

3. The method for writing servo patterns as recited in claim 1 wherein the first and second rotational speeds are lower than a normal operating speed of the disc drive.

4. The method of claim 1 further comprising a step of (g) selecting the second rotational speed that is slower than the first rotational speed.

5. The method of claim 1 further comprising a step of (g) selecting the second rotational speed which is different than the first rotational speed or drive operating speed, said second rotational speed selected so as to minimize the causes of repeatable and non-repeatable run out in the disc drive.

6. The method of claim 1 further comprising a step of (g) selecting the second rotational speed which is different than the first rotational speed, said second rotational speed selected so as to minimize a spindle motor gyro effect in the disc drive.

7. The method of claim 1, wherein the clock signal of writing step (t) is provided by a phase lock loop circuit tracking a signal provided by a clock head reading the clock track.

8. The method of claim 1, wherein the pattern generator of generating step (e) is clocked to the clock signal generated by phase lock loop circuitry tracking a signal provided by a clock head reading the clock track.

9. The method of claim 1, in which the pattern generator of generating step (e) is clocked to the clock signal provided by a phase lock loop circuit tracking a signal provided by a clock head reading the clock track, and wherein the correct timing relative to the clock signal of writing step (f) is provided by the phase lock loop circuit tracking the signal provided by the clock head reading the clock track.

10. The method of claim 1, in which the pattern generator of generating step (e) is clocked to the clock signal provided by a phase lock loop circuit tracking a signal provided by a clock head reading the clock track, and wherein the correct timing relative to the clock signal of writing step (f) is provided by the phase lock loop circuit tracking the signal provided by the clock head reading the clock track, and in which the servo pattern written to an area of the disc other than the area of the disc having the clock track.

11. A method for writing servo patterns on at least one disc in a disc drive comprising steps of:
    (a) spinning the disc at a first selected rotational speed;
    (b) writing a clock track on the disc at the first selected rotational speed;
    (c) selecting a second rotational speed that is faster than the first rotational speed;
    (d) spinning the disc at the second rotational speed;
    (e) tracking the written clock track pattern on the disc using the servo clock phase lock loop circuitry while the disc rotates at the second rotational speed; and
    (f) writing servo information at the second rotational speed.

12. A servo track writer for writing a servo pattern to a head disc assembly which includes at least one disc and a transducing head, the servo track writer comprising:
    a clock head in transducing relation to the disc, the clock head writes a clock track to the at least one disc and generates a signal when the clock head reads the clock track on the at least one disc;
    a phase lock loop clock generator comprising a voltage controlled oscillator providing a clock signal communicating with a comparator and a low pass filter, the comparator in communication with the signal providing a comparator output signal in response to the signal, the low pass filter producing a filter signal that is fed back to the voltage controlled oscillator to synch up the voltage controlled oscillator with the signal, thereby keeping the clock signal substantially synchronized to the signal;
    a servo pattern generator communicating with the phase lock loop clock generator clocked to the clock signal, the servo pattern generator generating the servo pattern timed to the clock signal; and
    a transducing head communicating with the servo pattern generator writing the servo pattern to the disc at a correct timing relative to the clock signal synchronized with the signal.

13. The servo track writer for writing a servo pattern to the head disc assembly of claim 12 wherein the at least one disc has a first surface and a second surface, the servo pattern generator writing to the first surface and the second surface of the disc.

14. The servo track writer for writing a servo pattern to the head disc assembly of claim 12 wherein the servo pattern generator writes an embedded servo information pattern to the at least one disc with the transducing head.

15. The servo track writer for writing a servo pattern to the head disc assembly of claim 12 further comprising:

- a mounting fixture for mounting the head disc assembly, the mounting fixture providing a mechanical reference for the servo track writer as the servo pattern is written to the head disc assembly; and
- a positioner for controlling the position of an actuator of the head disc assembly.

16. The servo track writer for writing a servo pattern to the head disc assembly of claim 15 further comprising a spindle controller for controlling a spindle motor of the head disc assembly.

17. The servo track writer for writing a servo pattern to the head disc assembly of claim 15 further comprising a spindle controller for controlling a spindle motor of the head disc assembly, said spindle controller capable of controlling the spindle at a first operating speed and a second servo writing speed, wherein the second servo write speed is distinct from the first operating speed.

18. The servo track writer for writing a servo pattern to the head disc assembly of claim 17 wherein the second servo writing speed is faster than the first operating speed of the spindle.

19. The servo track writer for writing a servo pattern to the head disc assembly of claim 18 further comprising a controller for controlling the positioner, the servo pattern generator, the phase lock loop clock generator, and the spindle controller.

20. A servo track writer for writing servo information to a head disc assembly comprising:

- a servo pattern generator; and
- means for writing servo information to the disc while the disc rotates at a speed other than the operating speed of the disc drive.

\* \* \* \* \*